United States Patent Office 3,403,062
Patented Sept. 24, 1968

3,403,062
PLASTISOL BINDER COMPOSITION FOR ROCKET PROPELLANTS CONTAINING AZIDE AND HYDRAZINE COMPOUNDS
Calvin E. Pannell, Walnut Creek, and Eric D. Lund, Pleasant Hill, Calif., assignors to The Dow Chemical Company, Midland, Mich.
No Drawing. Filed Nov. 30, 1965, Ser. No. 510,714
4 Claims. (Cl. 149—36)

ABSTRACT OF THE DISCLOSURE

The invention is to a plastisol composition comprising a polymeric triaminoguanidinium azide based source material, a high molecular weight hydrophilic polymer containing functional anhydride groups and a liquid organic compound having a carbon to nitrogen ratio of at least one and having at least two

groups. This plastisol has a reducing character, possesses a higher energy than conventionally employed binders and serves to provide excellent strength and structural characteristics in the fabricated propellant grain.

---

This invention relates to plastisol compositions and more particularly is concerned with a novel plastisol having a reducing character which is particularly suitable for use as a binder for solid propellants.

In the rocket and missile art, an ideal solid propellant composition is considered to be a fuel-oxidant mixture which not only is able to meet the diverse requirements of formulation and fabrication but also possesses the requisite strength to retain a predetermined configuration under flight and combustion conditions. Fuels and oxidizers alone cannot on a practical basis be fabricated into a propellant grain having good strength and structural characteristics. To fabricate solid propellants which meet the requirements for strength and configuration stability, binder materials must be employed. Conventionally, plastisol binders such as solid polymeric nitrocellulose or polyvinyl chloride plasticized with relatively non-volatile liquid oxidants such as nitroglycerine, triethylene glycol dinitrate or trimethylolethane trinitrate are employed. Although the resultant propellant compositions possess good strength and structural characteristics, the use of these conventional binders lowers the impulse over that which would be achieved by use of the fuel-oxidizer alone.

Now, unexpectedly a novel binder composition for solid propellants has been found which possesses a higher energy than the conventionally employed binders as well as serves to provide excellent strength and structural characteristics in the fabricated propellant grain.

It is a principal object of the present invention to provide a novel plastisol binder for propellants employing non-oxidizing plasticizers.

It is another object of the present invention to provide a high energy binder for solid propellants which has desirable high nitrogen to carbon and hydrogen to carbon ratios resulting in lower molecular weight exhaust gases and hence a higher $I_{sp}$.

It is a further object of the present invention to provide a plastisol binder which imparts good tensile strengths to cured compositions of fuel, oxidizer and binder as well as gives uncured compositions having viscosities which permit the necessary operations of mixing and casting during propellant grain fabrication.

It is another object of the present invention to provide a novel binder composition which exhibits a high elongation thus providing a flexibility which leads to good characteristics during thermal cycling and resistance to cracks on ignition.

It is also an object of the present invention to provide a novel plastisol binder composition the physical properties and energy contents of which are such that a minimal decrease in thrust results when the binder is incorporated into a propellant composition.

These and other objects and advantages readily will become apparent from the detailed description presented hereinafter.

The present novel plastisol composition comprises (1) a polymeric triaminoguanidinium azide based source material, (2) a high molecular weight hydrophilic polymer containing functional anhydride groups and (3) a liquid organic compound having a carbon to nitrogen ratio of at least one and having at least two

groups as a fluidizer for the polymeric triaminoguanidinium azide based source material. (Hereinafter, the term "polytriaminoguanidinium" will be used as a designation for the "polymeric triaminoguanidinium" based materials.)

More particularly, the plastisol composition of the present invention comprises from about 20 to about 90 weight percent of polytriaminoguanidinium azide or a modified polytriaminoguanidinium azide resulting from the pyrolysis of triaminoguanidinium azide in the presence of either cyanamide or malononitrile, or mixtures of polytriaminoguanidinium azide and such modified polytriaminoguanidinium azide materials, from about 5 to about 20 weight percent of either a methyl vinyl ether-maleic anhydride copolymer, an ethylene-maleic anhydride copolymer or mixtures thereof and from about 5 to 60 weight percent ethylene dihydrazine, hydrazine, monomethyl hydrazine, monoethyl hydrazine, sym.-dimethyl hydrazine and ethylene diamine. Of these fluidizers, hydrazine, monomethyl hydrazine, monoethyl hydrazine, sym.-dmiethyl hydrazine and ethylene diamine are apparently less strongly hydrogen bonded than is ethylene dihydrazine. Therefore, in a given composition, within the concentration range set forth herein, to produce the same degree of fluidity quantities of the less readily hydrogen bonded fluidizers used are only about half of ethylene dihydrazine.

Preferably the present novel composition comprises from about 50 to about 75 weight percent of polytriaminoguanidinium azide or a cyanamide or molononitrile modified polytriaminoguanidinium azide, about 15 percent of a high viscosity methyl vinyl ether-maleic anhydride copolymer or a high viscosity ethylene-maleic anhydride copolymer and from about 10 to about 35 weight percent ethylene dihydrazine.

The modified polytriaminoguanidinium azide materials suitable for use in the present invention can be prepared by pyrolyzing triaminoguanidinium azide with ether malononitrile or cyanamide. Ordinarily in the actual preparation of these modified polytriaminoguanidinium azide materials, triaminoguanidinium azide and from about 2 to about 20 weight percent, based on the weight of triaminoguanidinium azide, of malononitrile or cyanamide are reacted in a slurry reactor in the presence of an inert carrier, e.g. a paraffinic hydrocarbon, for a period of from about 2 to about 10 minutes at a temperature of from about 150 to about 170° C. The malononitrile modified triaminoguanidinium azide or cyanamide modified polytriaminoguanidinium azide product is recovered almost quantitatively as a solid ranging in consistency from a taffy-like material to a coarse or fine powder. The product form as well as N/C ratio can be predetermined by the reactant proportion and reaction conditions employed.

In using the plastisol composition of the present invention as a binder for a solid rocket propellant system, the binder is mixed with the fuel, oxidizer and other additives that may be employed. The components are blended, poured, and cast, pressed, or extruded into a predetermined propellant grain configuration. The grain is cured and subsequently treated in a conventional manner. The binder will be used in an amount of from about 10 to about 60 weight percent of the total propellant grain, depending upon energy and strength requirements of the grain as discussed hereinbefore.

The present novel binder composition can be used in fabricating propellant grains having oxidizers and fuels selected from a wide variety of materials employed in such compositions.

For example, oxidizers such as ammonium perchlorate, coated nitronium perchlorate, ammonium nitrate, coated hydrazine nitroformate, hydrazine perchlorate, lithium perchlorate, cyclotrimethylene trinitramine (RDX), cyclotetramethylene tetranitramine (HMX) and the like all can be blended with the present novel binder. Similarly particulate metal fuels such as aluminum and lithium, light metal hydrides such as lithium hydride, aluminum hydride, beryllium hydride, lithium aluminum hydride and organic nitrogen-hydrogen fuels having high N/C ratios such as 5-aminotetrazole, diaminotetrazene, triaminoguanidinium azide hydrazine azide double salt, lower guanidine azide salts such as diamino- and monoaminoguanidinium azide and the like can also be incorporated into the grains.

The reducing fuel type binders of the present invention are uniquely adapted for use in the solid fuel section of "hybrid" type rockets where the oxidizer is stored separately from the fuel and controllably fed onto the combustion surface of the fuel. The highly desirable start-stop feature of this type of rocket enables the omission of oxidizers from the solid fuel composition as well as a hypergolic reaction between oxidizer and fuel material. In conventional practice, fuel-rich propellant grains are used in such hybrids to avoid ignition problems in on-off operation because conventional hybrid binders are not hypergolic with oxidizers. Ethylene dihydrazine, for example, is hypergolic with $N_2O_4$, $ClF_3$ and the like oxidizers thereby providing the additional advantage that the present binder system can be used satisfactorily in on-off solid propellant systems.

The following examples will serve to further illustrate the present invention but are not meant to limit it thereto.

Example 1.—About 15 parts by weight of a methyl vinyl ether-maleic anhydride copolymer (Gantrez AN–169) was added to a mixture of about 65 parts by weight polytriaminoguanidinium azide and 20 parts by weight ethylene dihydrazine. To the resulting plastisol composition was added about 300 parts by weight of 20 mesh glass beads which served as a simulated solid "fuel and oxidizer." The resulting mixture was blended, cast into standard micro-tensile mold forms and cured at about 65° C. under a dry nitrogen atmosphere. Determination of the tensile strength and elongation after 24 hours cure indicated the strength of the cured simulated propellant grain to be 63 pounds per square inch. The grain exhibited an elongation of about 26 percent. Examples which were cured for 42 hours exhibited a tensile strength of about 135 pounds per square inch with 30 percent elongation.

A number of tensile test specimens formulated from the same composition as described directly hereinbefore were cast into the micro-tensile molds and cured for periods of from about 1 to about 10 days at temperatures ranging from about room temperature to about 70° C. The results of this study indicated that a temperature of at least about 45° C. is required to achieve curing within from about 1 to about 5 days. At temperatures about 55 to about 65° C. a satisfactory cure resulted within from about 1 t oabout 5 days. At temperatures above 70° C. gassing occurred. In the preparation of a propellant grain, this could lead to undesirable voids in the cured product.

Example 2.—Following the same formulation procedures described in Example 1 a number of binders were

TABLE I

| Run No. | Binder composition, percent by weight | | | Formulation composition, percent by weight | | Cure temperature, °C. | Tensile strength of cured formulations | | | | | | | | | | |
|---|---|---|---|---|---|---|---|---|---|---|---|---|---|---|---|---|---|
| | | | | | | | Maximum tensile, p.s.i. | | | | Elongation at maximum tensile, percent | | | | Ultimate elongation, percent | | | |
| | Polytriaminoguanidinium azide source material | | Polymer | Binder | Filler [2] | | Cure time at 60° C., days | | | | | | | | | | | |
| | Cyanamide modified polytriaminoguanidinium azide [1] | Ethylene dihydrazene | Methyl vinyl ether-maleic anhydride | | | | 1 | 2 | 5 | 6 | 1 | 2 | 5 | 6 | 1 | 2 | 5 | 6 |
| 1 | 25 | 60 | 15 | 33 | 67 | 60 | 25 | 24 | 28 | ---- | 30 | 30 | 27 | ---- | 30 | 39 | 39 | ---- |
| 2 | 50 | 35 | 15 | 33 | 67 | 60 | 25 | 25 | 28 | ---- | 45 | 80 | 85 | ---- | 64 | 116 | 132 | ---- |
| 3 | 65 | 20 | 15 | 33 | 67 | 60 | 24 | 32 | ---- | 48 | 22 | 90 | ---- | 68 | 33 | 136 | ---- | 120 |
| 4 | 65 | 20 | 15 | 25 | 75 | 60 | 27 | 48 | ---- | 80 | 25 | 53 | ---- | 26 | 42 | 76 | ---- | 90 |
| 5 | 70 | 15 | 15 | 30 | 70 | 60 | 28 | 45 | ---- | 93 | 28 | 39 | ---- | 22 | 22 | 55 | ---- | 51 |
| 6 | 75 | 10 | 15 | 33 | 67 | 60 | 29 | 57 | 68 | ---- | 9 | 17 | 25 | 167 | 22 | 31 | 25 | ---- |
| 7 | 70 | 15 | 15 | ---- | ---- | 50 | 46.5 | ---- | ---- | 44.6 | 89 | ---- | ---- | ---- | ---- | ---- | ---- | ---- |
| 8 | 64 | 21 | 15 | 33 | 67 | 60 | 24.1 | 32.4 | ---- | ---- | 21.7 | 90 | ---- | ---- | ---- | ---- | ---- | ---- |
| | | | Ethylene maleic anhydride copolymer | | | | | | | | | | | | | | | |
| 9 | 65 | 20 | 15 | ---- | ---- | 50 | 20.7 | ---- | ---- | 41 | 20 | ---- | ---- | 40 | ---- | ---- | ---- | ---- |
| | Polytriaminoguanidine azide | | Methyl vinyl ether-maleic anhydride | | | | | | | | | | | | | | | |
| 10 | 70 | 15 | 15 | ---- | ---- | 50 | 43.2 | ---- | ---- | 35.4 | 132 | ---- | ---- | 150 | ---- | ---- | ---- | ---- |
| 11 | 55 | 30 | 15 | ---- | ---- | 50 | ---- | ---- | ---- | 8.2 | ---- | ---- | ---- | 48.5 | ---- | ---- | ---- | ---- |

[1] N/C ratio 5. Prepared by pyrolyzing triaminoguanidinium azide with 20 percent by weight of cyanamide.   [2] Glass beads—simulated solid fuel and oxidizer.

prepared and those cured alone or after blending with glass beads (100 U.S. Standard Sieve). The resulting compositions were cast and cured for a predetermined period of time at either about 50 or about 60° C. Tensile strength and elongation of the resulting cured binders or "grains" were determined.

The composition data and strength characteristics of the resulting cured products are summarized in Table I.

Example 3.—The binder compositions described in Examples 1 and 2, upon blending with particulate ammonium nitrate and particulate aluminum, for example, at binder-fuel oxidizer ratios corresponding to those set forth in the examples and providing substantially fuel-oxidizer balanced grains, when cast into grains and cured as set forth herein provide substantially void-free, elastomeric solid propellant grains.

This grain burns smoothly with high impulse and good efficiency.

Plastisols of the same general characteristics can be prepared using a malononitrile modified polytriaminoguanidinium azide in conjunction with the polymer and fluidizer for the polytriaminoguanidine azide set forth hereinbefore.

In a manner similar to that described for the preceding examples, plastisols in accordance with the present invention and suitable for use as propellant binders can be prepared using hydrazine, monomethyl hydrazine, monoethyl hydrazine, sym.-dimethyl hydrazine and ethylene diamine as a solubilizer or fluidizer for the polytriaminoguanidinium azide based component. Likewise other high molecular weight hydrophilic polymers containing anhydride functional groups can be utilized as the reinforcing member for the polytriaminoguanidinium azide based component.

Various modifications can be made in the present invention without departing from the spirit or scope thereof for it is understood that we limit ourselves only as defined in the appended claims.

We claim:
1. A plastisol composition which comprises
(a) from about 20 to about 90 weight percent of a polytriaminoguanidinium azide based source material,
(b) from about 5 to about 20 weight percent of a high molecular weight hydrophilic polymer containing functional anhydride groups which polymer is selected from the group consisting of methyl vinyl ether-maleic anhydride copolymers, ethylene-maleic anhydride copolymers or mixtures thereof, and
(c) from about 5 to about 60 weight percent of a liquid organic compound having a carbon to nitrogen ratio of at least one and having at least two

groups and selected from the group consisting of ethylene dihydrazine, hydrazine, monomethyl hydrazine, monoethyl hydrazine, sym.-dimethyl hydrazine or ethylene diamine.

2. The composition as defined in claim 1 wherein the polytriaminoguanidinium azide source material is a member selected from the group consisting of polytriaminoguanidinium azide, a modified polytriaminoguanidinium azide resulting from the pyrolysis of triaminoguanidinium azide in the presence of cyanamide or malonitrile or mixtures thereof.

3. The composition as defined in claim 1 wherein the liquid organic compound is ethylene dihydrazine.

4. The composition as defined in claim 2 having from about 50 to about 75 weight percent of said polytriaminoguanidinium azide source material, about 15 weight percent of said methyl vinyl ether-maleic anhydride copolymer, ethylene-maleic anhydride copolymer or mixtures thereof and from about 10 to about 35 weight percent ethylene dihydrazine.

References Cited

UNITED STATES PATENTS

| | | | |
|---|---|---|---|
| 3,206,341 | 9/1965 | Reynaud et al. | 149—36 X |
| 3,268,376 | 8/1966 | Haldeman et al. | 149—36 X |
| 3,288,660 | 11/1966 | Niles et al. | 149—36 |

BENJAMIN R. PADGETT, *Primary Examiner.*